Nov. 13, 1962     J. FLEISCHER ETAL     3,063,584
TRUCK WITH CABLE REEL LOADING AND UNLOADING MEANS
Filed April 25, 1958     2 Sheets-Sheet 2
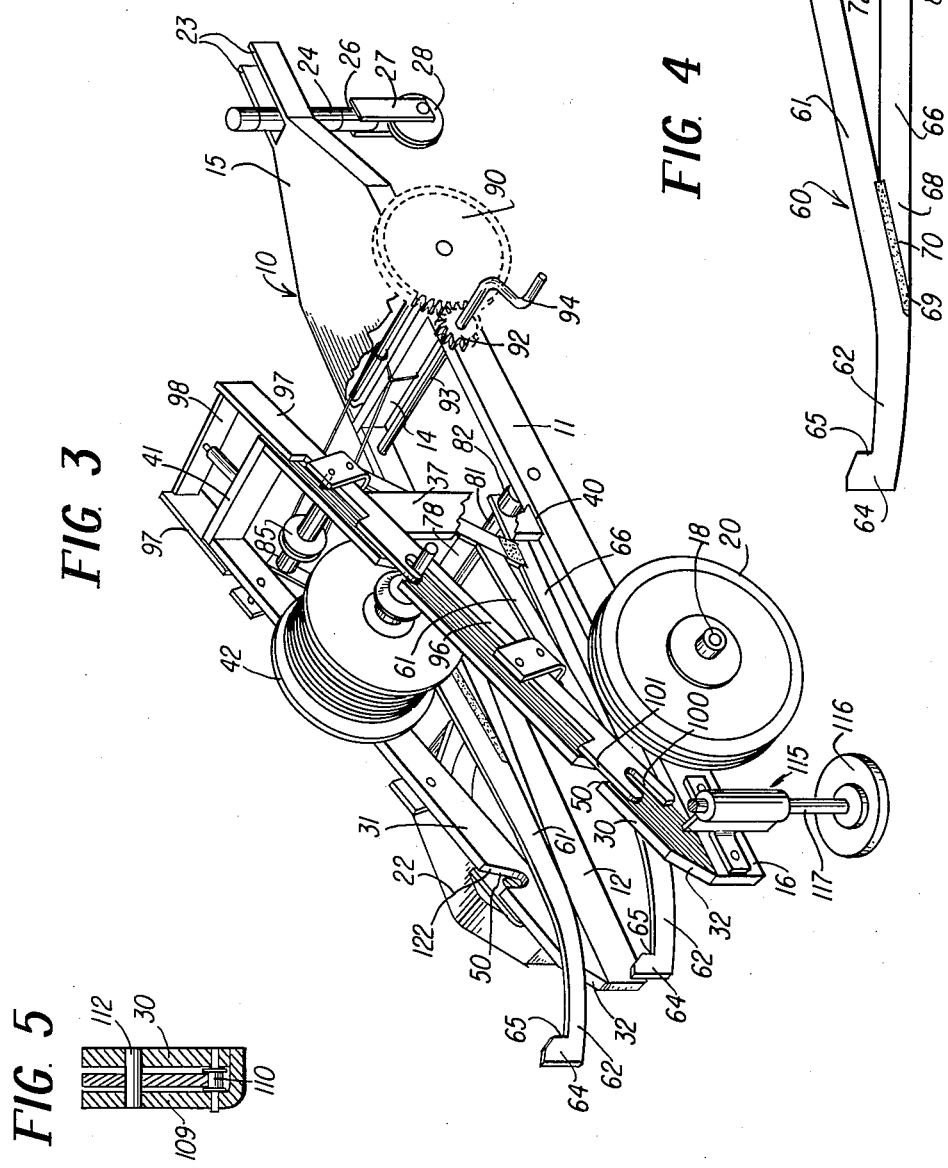
INVENTORS
JOSEPH FLEISCHER
BY   WILLIAM S. MATT
*Morris Spector*
Attys.

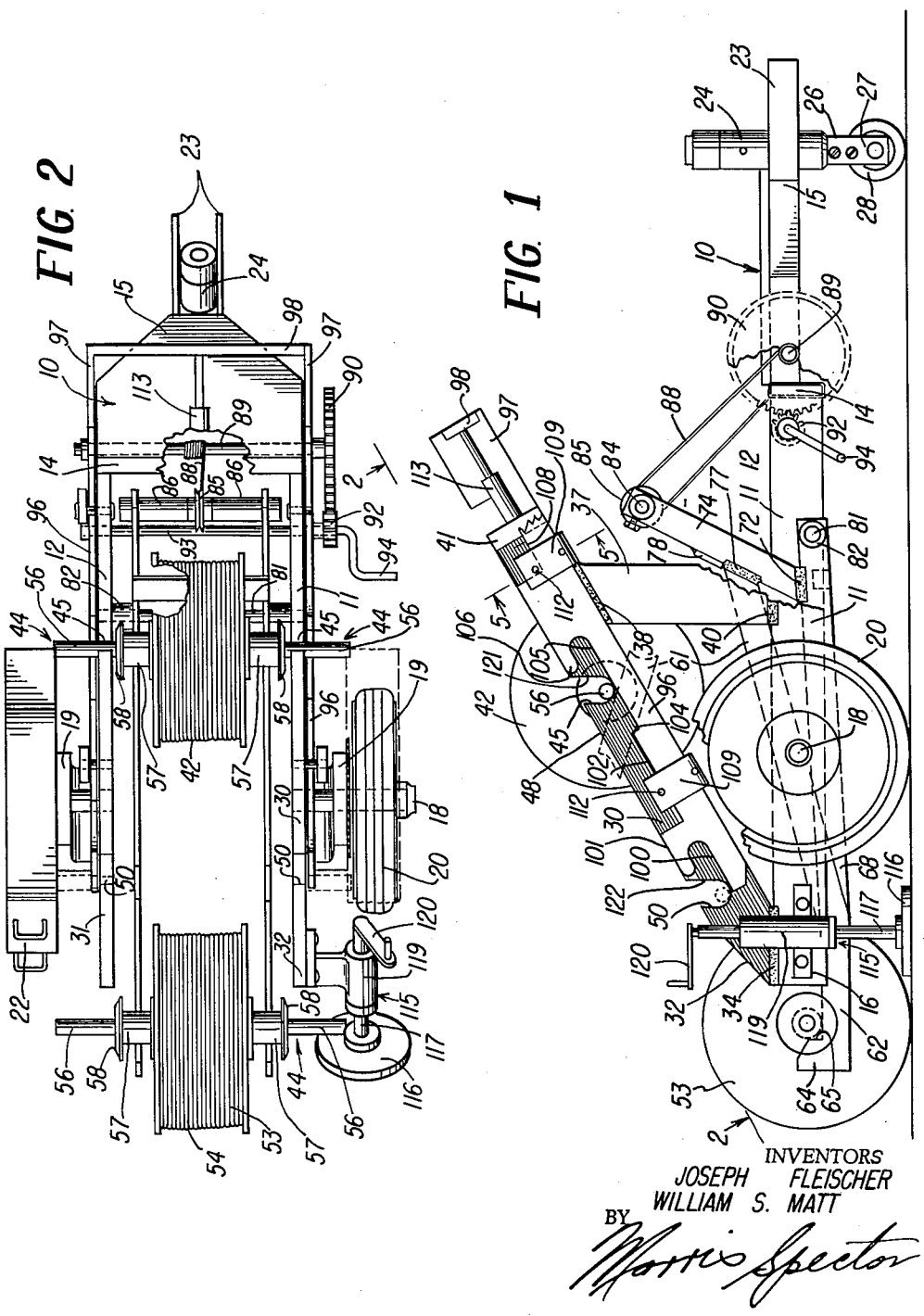

United States Patent Office 3,063,584
Patented Nov. 13, 1962

3,063,584
TRUCK WITH CABLE REEL LOADING AND
UNLOADING MEANS
Joseph Fleischer and William S. Matt, Chicago, Ill.; said
Matt assignor to said Fleischer
Filed Apr. 25, 1958, Ser. No. 730,976
10 Claims. (Cl. 214—77)

This invention relates to carrier means for the transport of cable reel units and the like, and has particular reference to an improved wheeled carrier adapted for the handling and transport of comparatively large and heavy cable reel units, as reels of lead sheathed electrical conductor cable.

An object of the invention is to afford a wheeled cable reel carrier of improved construction, providing for secure reel mounting in transport position thereon, and having relatively simple yet highly effective reel handling means for reel transfer to and between ground support and transport mounted position on the carrier.

Another object of the invention is to provide an improved cable reel carrier of the character above indicated, adapted, in particular, for the transport of cable reels having or provided with central projecting axle or hub means, and wherein the reel handling means of the carrier is effective through the reel axle or hub means.

The foregoing and other objects and advantages of the present invention will appear from the following description of a presently preferred embodiment thereof as such is exemplified in the accompanying drawings, wherein:

FIG. 1 is a side elevational view of a cable reel carrier according to the present invention, the view showing one reel in transport mounted position on the carrier and a second reel in ground support adjacent one end of the carrier;

FIG. 2 is a top view of the carrier, as viewed from line 2—2 in FIG. 1;

FIG. 3 is a perspective view of the improved carrier;

FIG. 4 is a view in side elevation of the reel handling lever structure as employed in the carrier, and FIG. 5 is an enlarged sectional detail view through a portion of the carrier structure, the view being taken from line 5—5 in FIG. 1.

The presently improved reel carrier as illustrated in the drawings, is provided in particular, for the ready handling and transport of comparatively large and heavy reel units of lead sheathed electrical conductor cable, wherein the reel structure or body of each such unit includes or is provided with a central axle or hub means projecting from opposite sides of the reel body. However, it may be employed with equal facility, in the handling and transport of similar reels supporting wire rope or other reelable material, or the carrier may be adapted, by modifications thereof within the principles of the present invention, for the handling and transport of devices or objects other than cable reels.

With reference now to the views of FIGS. 1, 2 and 3, the carrier as illustrated, is of wheeled, trailer type provided for ground and roadway travel in releasably coupled relation to a tractor unit or other motor vehicle or the like (not shown), and positionable, as by its tractor unit, in advantageous or desired positions for reel pick up from, or reel deposit to, ground support. The carrier comprises a frame structure 10 providing spaced apart and generally parallel, longitudinal frame members 11 and 12 rigidly united, as by welding (not shown), with a transverse frame member 14 adjacent the forward or front end portion 15 of the frame structure. Extending laterally and outwardly from each frame member, at a point inwardly adjacent the rear end 16 of the member, is a wheel axle 18 which is supported, in part, by an axle bracket 19 suitably secured on the outer side of the frame member. Journalled on each axle 18 is a ground wheel 20, which may be a rubber tired wheel as indicated. In shielding relation to each wheel is a suitable cover or fender 22 (only one thereof being here shown) carried by the bracket 19.

The carrier frame in its forward portion 15, terminates in forwardly projecting frame arms 23 near the longitudinal center line of the frame, these arms being adapted in suitable manner not here shown, for releasable coupling to a carrier tractor unit (not shown). Carried by said arms 23 therebetween, is a journal unit 24 for a vertical swivel member 26 the lower bifurcate end portion 27 of which supports a ground wheel 28.

Carried by the frame members 11 and 12 are a pair of rails 30 and 31 in parallel, inclined positions thereon. As shown in the drawings, the rail 30 is arranged substantially in the vertical longitudinal plane of the associated frame member 11, and inclined relative to the latter at an appreciable angle, as of the order of 30 degrees, with its lower beveled end portion 32 secured, as by welding at 34, to the rear end portion 16 of frame member 11. Rail 30 is supported near its upper end, by a frame strut 37 preferably welded to the rail at 38 (FIG. 1) and to the frame member 11 at 40. The other rail 31 is mounted on frame member 12 in like manner and at the same inclination, while rigidly joining the rails at their upper ends is a transverse bar 41. The rails are laterally spaced to accommodate with appreciable clearance therebetween, cable reel units such as the reel unit 42 shown in FIGS. 2 and 3, and form a reel trackway for engagement by reel axle or hub portions 44 in rolling contact thereon, as will be hereinafter referred to.

In the present example, the trackway forming rails 30 and 31 provide an upper pair of rail recesses 45 in transverse alignment and each open to the upper edge or rail surface 48 of its associated rail, these recesses being adapted for receiving reel hub portions and defining an upper reel transport mounting station on the carrier. A like pair of rail recesses 50 near the lower ends of the rails, afford a similar lower reel transport mounting station on the carrier. The spacing of the station forming recesses 45 and 50 longitudinally of the rails, is such as to accommodate reels without abutment or interference therebetween. Also, each of the recesses 45 and 50 is directed such that its longitudinal axis is substantially vertical or normal to the carrier frame, and hence at an angle to the rails, as for a purpose to appear.

As best appears from FIG. 2, which shows one cable reel, as the unit 42, at the upper mounting station of the carrier and a second cable reel unit 53 in ground support adjacent the rear end of the carrier, the cable reel units handled by the present carrier are of a character wherein each includes a central axle or hub means 44. Preferably and as here shown, such axle or hub means is formed in its projection from each side of the reel body 54, to afford an outer shaft element 56 for trackway engagement, and an inner, preferably larger diameter hub portion 57 for engagement by reel transfer and displacement producing means presently to be described. Further, each reel hub means includes a flange 58 at the juncture of each shaft element 56 with the larger diameter hub portion 57, these flanges 58 forming guide means engageable with the inner sides of the rails 30 and 31 in reel displacement along the trackway, to retain the reel in substantially centered relation thereto.

Provided for cooperation with the rail trackway in cable reel handling, is a carrier supported reel-engageable operating mechanism which in the present example, is a pivotal lever structure of a construction suitable for the handling of relatively heavy cable reels as herein contemplated. Such lever structure comprises a pair of lever arms 60 each formed, as shown more particularly in FIG. 4, by a long bar 61 preferably curved, as shown, in its forward end portion 62 and terminating in an upstanding projection 64 forming a shoulder 65. A shorter brace bar 66 extends beneath and in the plane of bar 61 at an acute angle thereto, and has its end portion 68 adjoining and merging into the lower edge surface 69 of bar 61, and welded thereto as at 70. Welded at 72 to the opposite or rear end portion 73 of bar 66, is a bar 74 extending upwardly at an angle to the latter. Lever arm 61 at its rear end 76, is welded to an intermediate portion of bar 74, as at 77.

The lever arms 60 as so formed, are joined rigidly in predetermined spaced apart, parallel relation, by a transverse member 78 between bars 74, and a transverse member 80 between bars 66. As best appears in FIG. 2, the predetermined spacing of the arms 60, which is appreciably less than the spacing of frame members 11—12 and rails 30—31, is selected with regard to the axial spacing of the larger diameter hub portions 57 of the cable reels to be handled, such as to afford arm engagement with the indicated reel hub portions 57 in reel handling.

The lever structure in carrier assembly, is pivotally disposed between the frame members 11—12, with its lever arms 60 extending in the direction of the rear end of the carrier, for angular movements vertically relative to the carrier frame and the inclined trackway rails thereon. Its pivotal support on the carrier frame is here effected by a pivot element or rod 81, such rod extending transversely between frame members 11 and 12 and pivotally engaged by the rear end portions 73 of the brace bars 66. Spacer sleeves 82 on rod 81, serve to center the lever structure between the frame members to facilitate reel handling, as will presently appear.

In accordance with the present improvements, the length of the bars 61 forming the lever arms 60, and the point of pivotal support of brace bars 66 (through pivot rod 81) longitudinally of the carrier frame, are predetermined such as to provide for most effective reel handling relative to the carrier and the trackway thereon. Thus, in lowered pivotal disposition of the lever arms 60 as illustrated in FIG. 1, the lever arm end portions 62 project outwardly beyond the rear end of the carrier, thereby to facilitate ready engagement of the lever arm ends at the shoulders 65 thereof, with the hub portions 57 of a cable reel in ground support adjacent the rear end of the carrier frame. Upon upward pivotal displacement of the lever arms 60 from said lowered position toward and to the region of the reel mounting station afforded by the rail recesses 50, the arms 60 will bear an acute angular relationship to the vertical axes of these recesses, approaching a right angular relation thereto (as this may be observed from FIG. 3). Further upward pivoting of the lever arms to the reel mounting station afforded by rail recesses 45, will bring the lever arms 60 into an acute angular relationship to the vertical axes of these recesses, as to the angular degree indicated by the phantom or broken line showing of the arms in FIG. 1. Such angular relationships between the lever arms and the rail recesses, enable the lever arms to perform a camming action on the reel hubs in reel seating and removal relative to the mounting stations, as this will appear hereinafter.

As here illustrated by way of example only, pivotal actuation of the lever structure is effected through manually operable gearing. Joining the upper ends of the lever structure bars 74 is a shaft 84 which rotatably supports a grooved pulley wheel 85 preferably centered on the shaft by spacer sleeves 86 (FIG. 2). A suitable cord or rope 88 having one end thereof fixed to the carrier frame member 14 (FIG. 1), is extended over the grooved pulley and to wrapped condition on a shaft 89 extending transversely of the carrier frame in rotary support thereon. Fixed to one projecting end of shaft 89 is a gear wheel 90 which is engaged by a drive pinion 92 on a shaft 93. Shaft 93 extends transversely of the frame members 11 and 12 in rotative support thereby, and provides a manual crank handle 94 at its pinion end. Thus, by cranking the pinion to drive gear 90 in one direction or the other, the rope 88 will be correspondingly wrapped or unwrapped relative to shaft 89, whereby to lengthen or shorten the rope span and thus cause pivotal movements of the lever structure. It will be appreciated that pivotal actuation of the lever structure may be accomplished through operation of gear 90 by power means (not shown), as electrical or other motor means, or by motor means acting directly on the lever structure in suitable manner. Also, although not here shown, suitable holding means may be provided in releasable association with gear 90 or the pinion 92, to retain any desired pivotally actuated position of the lever arms 60.

Operatively associated with the rail trackway is a slide-bar structure affording means for retaining reels in station mounted positions on the carrier, and additional means for cooperation with the trackway rails as to facilitate reel transfer from the mounting stations onto the rails, as such will appear presently. The slide-bar structure comprises a pair of bar members 96 one arranged externally along each trackway rail in generally parallel relation thereto, the members extending beyond the upper ends of the rails and being rigidly joined at their projecting ends 97 by a cross member 98. Each member 96 is formed, as shown in FIGS. 1 and 3, to provide a lower end slot 100 open to the end of the member, and a planar top edge portion 101 above the slot. The intermediate length of the member above the slotted lower end, is reduced in step form, to provide a guide margin 102 and a lower step margin 104 terminating in a second slot 105 which is open in the same direction as slot 100. Slot 105 subtends a planar top edge portion 106 of the member, the latter extending to a reduced step guide margin 108 near the upper end of the member. The slots 100 and 105 are spaced longitudinally of the member 96 correspondingly to the spacing of the rail recesses 50 and 45 with which they cooperate in one position of the slide member, as will appear presently.

Slide mounting of each member 96 to its associated rail, may be effected by suitable rail carried brackets 109 extending over the outer side of the member, each bracket including therein a roller element 110 supported as shown in FIG. 5, engaged by the lower longitudinal margin of the member 96. Retention of the member in bracket support is attained as by bracket pin elements 112 (FIGS. 1, 3 and 5), the pin at the upper bracket (FIGS. 1 and 3) relatively closed overlying the step guide margin 108 of the member, while the pin at the lower bracket similarly closely overlies the guide margin 102 of the member. The bracket mounted condition of the members 96 on the rails, is such as to locate the planar top edge portions 101 and 106 thereof in the plane of the rail trackway surfaces 48, and to dispose the slots 100 and 105 for registry with the lower zones of rail recesses 50 and 45, respectively, in the downwardly displaced position of the members, as to the position thereof shown in FIG. 3. In such position (FIG. 3) of the members, hereinafter referred to as the effective position thereof, the slots 100 and 105 extend across the respective rail recesses 50 and 45, while the top edges 101 and 106 thereof span the upper open ends of the rail recesses 50 and 45, respectively, thereby closing the slots relative to the rails and providing laterally offset continuations of the rails, as for a purpose to appear. Upward displacement of the members 96, as to a retracted position such as indicated in FIG. 1, retracts the slots and top edges of the members to positions clear of the respective rail recesses.

As a means for facilitating substantially linear slide movements of the members 96 along the rails, a suitable guide cylinder and piston device 113 is provided between the rail cross member or bar 41 and the cross member 98 of members 96, in connection to these cross members at center points thereof. Also, while the members 96 may be directly manually positioned, it is to be understood that suitable operator controlled power means (not shown) may be provided on the carrier in displacement effecting connection to the slide members.

Turning to the operation of the reel carrier having the construction as now described, such will be considered first in respect to the application of a cable reel to transport position on the carrier. Assuming that the carrier is located on level ground or such that its frame is substantially horizontal, and in suitable proximity to ground supported cable reels to be handled, the lever arms 60 are pivotally actuated to a reel receiving position, as by manual crank operation of the gearing in control of the rope 88. Such position is that wherein the arm ends 62 are adjacent the ground at the rear of the carrier, sufficiently to clear the arm projections 64 below the reel hub portions 57 of a reel displaced to ground support between the arm ends 62. Reel 53 is so positioned as illustrated in FIGS. 1 and 2. Thereupon, the manual rope gearing is operated to produce lever arm elevation to an initial reel-handling or reel pick-up position wherein its arm ends 62 engage the reel hub portions 57, with the latter seated against the arm shoulders 65. Before further lever operation, the slide members 96 are displaced to the effective position thereof (FIG. 3) along the inclined trackway rails, wherein the edges 101 and 106 thereof span the rail recesses 50 and 45. Now, upon upward pivoting of the lever arms 60 through an initial angular extent, the arm engaged reel will be elevated from its ground support adjacent the rear end of the carrier frame, toward and to the rail trackway with the reel shaft elements 56 in rolling engagement first on the lower beveled ends 32 of rails 30 and 31, and then onto rails 30 and 31 below the rail recesses 50.

In order to prevent rear end tipping of the carrier in reel handling through the initial handling phase above described, as between the lower ends of the rails and ground, provision is here made for effective ground bracing of the carrier frame at its rear end. Such provision may be in the form of a suitable retractable ground shoe device, such as that shown at 115 at the rear end of frame member 11. Device 115, of well known construction, affords a ground engaging plate or shoe 116 on the lower end of a rod 117, the rod in turn extending upwardly through a cylinder member 119 fixed to the carrier frame member 11. The rod and cylinder may be in threaded connection, as through jack-type threading (not shown), so that upon rod rotation through rod handle 120, the ground brace shoe may be lowered to ground support, or elevated to an inactive position. While not here shown, a like ground brace device may be applied to the rear end of the opposite frame member 12.

Returning to lever operation and assuming that a reel is not already at the upper mounting station afforded by the rail recesses 45, further upward pivoting of the lever arms 60 will effect reel displacement in rolling movement upwardly along rails 30 and 31, the reel shaft elements 56 passing over recesses 50 by rolling on slide member edges 101 which then span the recesses. After the reel is displaced upwardly of the trackway past the rail recesses 50, the slide members 96 are moved to recess opening retracted positions (as indicated in FIG. 1), and then the reel is brought to the upper mounting station. As upward pivoting of the lever arms 60 brings the reel shaft elements 56 over the now open ends of the recesses 45, the sole support of the reel is then upon the lever arms through the reel hub portions 57. Whereupon and in consequence of the angular relationship or inclination of the lever arms with respect to the vertical axes of the recesses 45 (as hereinbefore indicated and as may be observed from the broken line showing thereof in FIG. 1), the lever arms 60 then perform a camming function relative to the reel hub portions 57, causing reel displacement on the arms in the direction to engage the reel shaft elements 56 with the upper sides of the recesses (as the upper side 121 of recess 45 shown in FIG. 1). Now, by reverse pivoting of the lever arms as in the direction of the rear end of the frame, the reel will be thereby lowered to full seating of its shaft elements 56 at the bottom ends of the recesses 45. Such reel (as reel 42 shown in the several figures) then is in carrier transport position at the upper mounting station. Moreover, it will be securely retained or locked in such position upon movement of the slide members 96 to the aforesaid effective position thereof, wherein and as may be observed from FIG. 3, the slide members embrace the reel shaft elements 56 through the slots 105 which then extend across the rail recesses 45. Thus the reel will be thereby held or locked in its transport mounted position, against unwanted or accidental displacement therefrom, as during ground or roadway travel of the carrier which may include travel over more or less steep grades or over rough terrain.

Transfer of the carrier mounted reel to ground support, as following carrier transport thereof to a point of reel use, is readily accomplished in the following manner. For present example, it is assumed again that the carrier is in substantially level ground support, such that its frame is horizontal. Now, upon carrier ground bracing through device 115 and displacement of slide members 96 to retracted positions clearing the rail recesses 45, the lever arms 60 then are pivotally actuated to engage the reel hub portions 57. Then, with continued pivoting of the arms upwardly, such arms will effect reel elevation normally by a camming action wherein the reel shaft elements 56 roll or slide upwardly along the upper sides of the rail recesses (as the recess side 121 shown in FIG. 1), to clear the shaft elements from the rail recesses. Such camming action results because of the angular relation of the lever arms with respect to the vertical axes of the rail recesses, as this will be appreciated from the broken line showing of the arms in FIG. 1. Following lever arm displacement of the reel from the recesses and to a position having its shaft elements 56 engaged on the trackway rails above the recesses, the slide bars 96 are moved to their effective positions wherein the edges 106 span the recesses 45 and thus close the latter to re-entry by the reel shaft elements. Now the trackway is in condition for reel transfer downwardly therealong, consequent to lever arm pivoting toward the rear end of the carrier. In such reel transfer and because of the trackway inclination, the reel then will be under gravity influenced displacement downwardly on the rails. This facilitates reel displacement from the mounting station to ground support through lever arm pivoting to the before described initial position thereof. It is to be observed that with the slide bars then in effective position, the lower rail recesses 50 will be closed by the bar edge portions 101, the latter then completing the rails over such recesses, for downward passage of the reel thereover, With the reel thus removed from the carrier to ground support at the carrier rear end, further lowering of the lever arms 60 will clear them from the reel hub portions 57 and so free the reel, as for ground rolling to the desired point of use.

It will appear now from the foregoing, that reel transfer between ground support and the lower mounting station on the carrier, as afforded by the lower rail recesses 50, is effected in similar manner. Considering reel transfer to the carrier and assuming the carrier to be on level ground such that its frame is substantially horizontal, reel pick-up and transfer to the rail recesses 50 is effected by upward pivoting of the lever arms 60. With the slide bars 96 then retracted from the recesses, the lever arms cause camming of the reel to engage its shaft elements 56 against the upper sides of the recesses 50 (as the recess side 122 shown in FIG. 1). Then upon reverse lever arm pivoting, the reel is lowered to seating of the shaft elements in the recesses. Whereupon, by return of the slide bars 96 to embrace the reel shaft elements through the slide bar slots 100 extending across the recesses, the reel will be locked in place at the lower mounting station. In reel removal from the recesses 50 and return to ground support, the operations of the slide bars 96 and the lever arms 60 are the same as hereinbefore described in respect to reel removal from the upper recesses 45.

The foregoing described operations of the reel handling provisions in effecting reel transfer to and from ground support and the carrier mounting stations defined by the rail recesses 45 and 50, has been related to carrier disposition with its frame substantially horizontal. However, in instances of necessary carrier location on non-level ground, as for reel pick-up or ground deposit, it is desirable that the carrier be positioned relative to the sloping or inclined ground area, such that the carrier frame is inclined downwardly in the direction of its forward end 15. When so disposed, the reel handling provisions may be then operated in the same manner and with equal effectiveness as hereinbefore described, for reel transfer either from the carrier to ground support or from ground onto the carrier. Where the carrier cannot be so disposed in a given area but must be inclined with its rear end lowermost, reel transfer between ground support and the carrier can be effected substantially as described provided carrier inclination is not excessive. Otherwise, the carrier will have to be relocated in an adjacent area more suitable for the purpose of reel pick-up or ground deposit by the handling provisions operating as before described.

It now will be obvious from the foregoing description in respect to the operation of the reel handling and transfer mechanism, that in reel loading of the carrier, a first reel is transferred from ground to the upper mounting station afforded by the rail recesses 45, and then a second reel is similarly transferred to the lower mounting station provided by the rail recesses 50. Subsequent carrier unloading is accomplished in reverse order, as by first removing the lower reel, and then removing the upper reel. Also, in instances where but one reel is to be transported, such reel preferably should be disposed at the upper mounting station, rather than at the lower station, as to obtain better reel balance of the carrier for road travel. Moreover, it is to be noted here that while the carrier as herein shown, is provided for the transport of two reels at a time, it is susceptible to adaptation within the principles of the present invention, to the accommodation of more than two reels.

Having described and illustrated a presently preferred embodiment of the invention, it will appear therefrom that the improved cable reel carrier affords a relatively simple yet highly effective and easily operated device for the handling and transport of comparatively heavy cable reels and the like, of the general character herein indicated. Although but one embodiment is here shown, it will be understood that various modifications may be made in respect to parts and the relative arrangement thereof, without departing from the scope of the invention as hereafter claimed.

What is claimed is:

1. In a carrier for the transport of cable reels and the like each characterized by oppositely projecting hub portions, a carrier frame, means on said frame forming a reel trackway engageable by the reel hub portions for rolling displacement therealong, frame-supported means movable selectively relative to said trackway and engageable with the hub portions of a reel for causing displacement of the reel selectively to and from said trackway and along the trackway, and means for retaining the reel in a fixed position relative to said trackway.

2. In a carrier for the transport of cable reels and the like each characterized by oppositely projecting hub portions, a carrier frame, means on said frame forming a reel trackway engageable by the reel hub portions for rolling displacement therealong, said trackway having reel hub seat means, frame-supported means movable selectively relative to the trackway and engageable with the hub portions of a reel for causing displacement of the reel selectively to and from the trackway and along the trackway to and from said seat means, and means positionable relative to at least one of the reel hub portions in reel positionment with its hub portions on said seat means, for constraining the reel to hub engagement on the seat means.

3. In a carrier provided for the transport of cable reels and the like and adapted for effecting reel transfer from ground support onto the carrier and from the carrier to ground support, a carrier frame, means on the frame providing a reel mounting station and a reel trackway between the station and one end of the frame, reel engageable lever means on said frame, said lever means being movable relative to said trackway and station and having an initial position for engagement with a reel in ground support adjacent said one end of the frame, the lever means in movement toward said station from said initial position of reel engagement, effecting transfer of the reel onto said trackway and displacement thereof along the trackway to said station, said lever means being operable at said station to effect reel displacement from the station, and means at said station cooperable with the lever means upon operation thereof to cause reel displacement from the station, to effect reel positionment on said trackway, the lever means thereupon in movement toward and to said initial position thereof, causing reel displacement along the trackway and reel transfer from the trackway to ground support adjacent said one end of the frame.

4. In a carrier provided for the transport of cable reels and the like characterized by hub portions projecting on opposite sides of the reel, and adapted for the transfer of reels from ground support onto the carrier and from the carrier to ground support, a carrier frame, substantially parallel rails on said frame and extending at an inclination thereon upwardly from one end of the frame, said rails forming a reel trackway engageable by the reel hub portions for rolling displacement therealong, the rails providing reel hub receiving recesses therein in alignment transversely of the rails, the recesses being located intermediate the ends of the rails and constituting a reel mounting station on the carrier, means on the frame providing lever arms movable relative to said trackway and station and adapted for reel hub engagement, said lever arms in movement relative to the trackway toward and to said station from an initial position of arm engagement with the hub portions of a reel in ground support adjacent said one end of the frame, effecting reel transfer to the trackway and reel displacement therealong with the reel hub portions in rolling contact with said rails, toward and to reel mounted position at said station with the reel hub portions seated in said rail recesses, and retractable recess closure and reel hub locking means on said rails and movable, selectively, to a recess closing and reel locking position relative to the reel hub portions seated in said rail recesses, for retaining the reel at said station, and to a retracted position clear of said recesses, said lever arms being movable at said station for effecting upon retraction of said retractable means, reel displacement to displace its hub portions from said rail recesses and onto the rails above the recesses, said retractable means in recess closure position following said reel hub displacement from the recesses, cooperating with the reel hub portions upon movement of said lever arms in the direction of said initial position, to effect reel displacement to engagement of its hub portions on said rails below said recesses, and continued movement of said lever arms toward and to said initial position, causing reel displacement along the trackway to said one end of the frame and reel transfer from the trackway to ground support adjacent said one end of the frame.

5. In a wheeled carrier provided for the transport of reel units having projecting hub means, and adapted for effecting reel transfer to and between ground support and transport mounted position on the carrier, the carrier comprising a frame, ground wheels in supporting connection to the frame, a pair of rails in spaced parallel position longitudinally on the frame and inclined upwardly thereon from one end of the frame, said rails providing a trackway for receiving a reel therebetween with the reel hub means in rollable engagement on the rails, the rails having transversely aligned recesses therein located intermediate the length of the rails and provided for reception of reel hub means in transport mounted position of a reel on the carrier, a pair of spaced parallel lever arms pivotally supported on the frame and extending in the direction of said one end of the frame in position for pivotal movements angularly relative to and between said rails, said lever arms being adapted for reel hub engagement and operable in pivotal movement from an initial position of engagement with the hub means of a reel in ground support adjacent said one end of the frame, to effect reel displacement to said trackway and upwardly therealong to the zone of said recesses, with the reel hub means in rolling travel on the rails, said lever arms further being operable in the zone of said recesses, to cause reel displacement to transport mounted position with its hub means seated in said recesses, and control means providing reel hub slots and recess spanning elements, said control means being carried by said rails for movement to and from a control position relative to the rail recesses, wherein said elements span the recesses and form rail continuations over the recesses, and said slots register in reel hub receiving relation with said recesses to retain the reel in transport mounted position, said lever arms being effective upon pivotal movement in the direction of and to engagement with the reel hub means seated in said recesses, and through continued movement in the same direction following movement of said control means from said control position, for causing reel displacement to an elevated position having its hub means removed from the recesses and engaging the rails upwardly beyond the recesses, whereupon return of the control means to said control position thereby locates its spanning elements in spanning relation to said recesses to close the latter against re-entry by the reel hub means, and said lever arms then being effective by pivotal movement in the direction of and to said initial position, for causing gravity-influenced displacement of the reel from said elevated position downwardly of the trackway with its hub means rolling over said spanning elements of the control means and along the trackway rails, and reel transfer from the trackway to ground support adjacent said one end of the frame.

6. In a wheeled carrier provided for the transport of cable reels and the like, and adapted for reel handling and transfer to and between ground and the carrier, a carrier structure, ground wheels in suppot of the structure, said structure providing a reel trackway having first and second reel mounting stations relatively spaced along the trackway, and reel handling means operatively supported on the structure in cooperative relation to said trackway and stations, said handling means being operable for effecting successively, transfer of a first reel from ground support onto said trackway and therealong past said first station to said second station, and transfer of a second reel from ground support onto the trackway and therealong to said first station, and said handling means further being operable for effecting successively, transfer of said second reel from said first station and along the trackway to ground support, and transfer of said first reel from said second station and along the trackway past said first station, to ground support, and station control means on said structure and shiftable selectively in and out of effective positions opening and closing the first station to permit the first reel to roll past said first station and the second reel to enter the first station.

7. A wheeled carrier provided for the transport of cable reels and adapted for reel handling and transfer to and between ground and the carrier, comprising a carrier structure, ground wheels in support of the structure, said structure providing an inclined reel trackway having lower and upper reel mounting stations relatively spaced along the trackway, reel handling lever means operatively supported on the structure for movement relative to the trackway and said stations, and station control means on said structure and common to said lower and upper stations, positionable selectively in and out of an effective position closing said stations to the trackway; said lever means being operable, with said control means in said effective position, to effect transfer of a first reel from ground support to said trackway and therealong past said lower station toward said upper station, thence being operable upon positionment of said control means out of its effective position, to effect mounting of said first reel at said upper station, and thence to effect transfer of a second reel from ground support to said trackway and therealong to mounting at said lower station; said lever means in reel removal from the carrier, being operable with said control means out of its effective position, to move said second reel from said lower station and to the trackway between the stations, and thence with said control means in effective position, to transfer said second reel along the trackway past said lower station to ground support, whereupon said lever means then being operable with said control means out of its effective position, to effect movement of said first reel from said upper station and to the trackway above the upper station, and thence with said control means in effective position, to effect transfer of said first reel along the trackway past the upper and lower stations to ground support.

8. A wheeled carrier in accordance with claim 7, wherein the said station control means includes means cooperable with reels mounted at the said lower end upper reel mounting stations, upon positionment of the control means in its said effective position, for constraining the reels to said stations.

9. A carrier for the transport of cable reels, said carrier comprising a frame having a mounting station, and means including a pair of lever arms for lifting a reel from ground-support upwardly to said frame and thereafter rolling the reel along the arms and frame to said mounting station and depositing it thereat, said means also being operable to remove the reel from the mounting station and allow controlled rolling movement of the reel along the arms and frame and to ground-support, and means positionable selectively in and out of effective positions closing and opening the station.

10. In a carrier for the transport of cable reels and the like each characterized by oppositely projecting hub portions, a carrier frame, means on said frame forming a reel trackway engageable by the reel for rolling displacement therealong, said trackway having reel seat means, frame-supported means movable selectively relative to the trackway and having means engageable with the hub portions of a reel and along which the reel is rollable for causing displacement of the reel selectively to and from the trackway and along the trackway to and from said seat means, and means shiftable relative to the trackway in and out of effective positions opening and closing the seat means and for constraining the reel to engagement on the seat means when in effective position closing the seat means.

References Cited in the file of this patent

UNITED STATES PATENTS

| | | |
|---|---|---|
| 1,231,040 | Marshall | June 26, 1917 |
| 1,587,842 | Knox | June 8, 1926 |
| 1,789,343 | Rogers | Jan. 20, 1931 |
| 2,336,748 | Pearl | Dec. 14, 1943 |
| 2,705,114 | Worsham | Mar. 29, 1955 |
| 2,763,383 | McCoy | Sept. 18, 1956 |
| 2,775,357 | De Arment | Dec. 25, 1956 |
| 2,792,134 | Kinnee | May 14, 1957 |

FOREIGN PATENTS

| | | |
|---|---|---|
| 1,003,960 | France | Nov. 21, 1951 |